(No Model.)
W. SELLERS.
RAILWAY WHEEL.
No. 372,573. Patented Nov. 1, 1887.
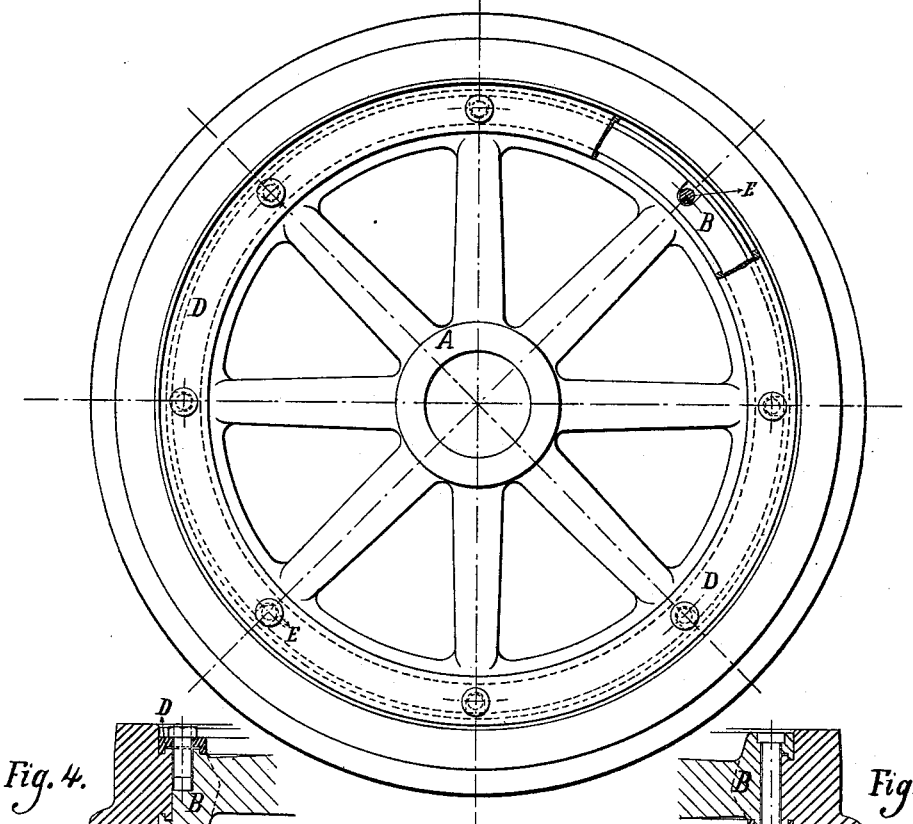
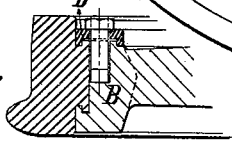
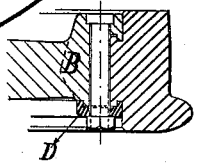
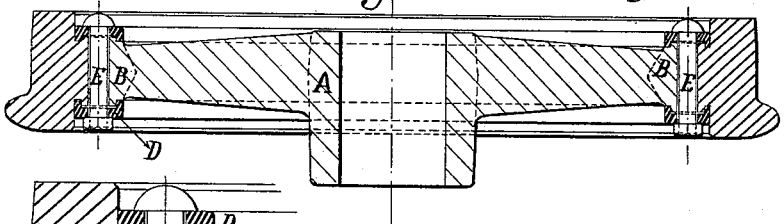
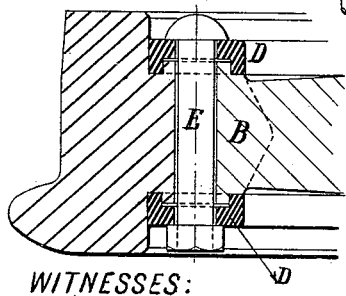
WITNESSES:
INVENTOR

UNITED STATES PATENT OFFICE.

WILLIAM SELLERS, OF PHILADELPHIA, PENNSYLVANIA, ASSIGNOR TO WILLIAM SELLERS & COMPANY, INCORPORATED, OF SAME PLACE.

RAILWAY-WHEEL.

SPECIFICATION forming part of Letters Patent No. 372,573, dated November 1, 1887.

Application filed April 27, 1887. Serial No. 236,366. (No model.)

*To all whom it may concern:*

Be it known that I, WILLIAM SELLERS, of the city and county of Philadelphia, in the State of Pennsylvania, have invented certain Improvements in Railway-Wheels and in the Process for Manufacturing a Part of the Same, of which improvements the following is a full and exact description, reference being had to the drawings forming a part of this specification, in which similar letters refer to similar parts.

My invention relates to that class of railway-wheels in which the central or hub portion is provided with a rim, to which it is connected by arms or by a plate or plates, and upon this rim a steel tire is shrunk and otherwise secured. The periphery of this tire forms the rolling-surface of the wheel; and my invention has more particular reference to the means by which this tire is secured to the rim and to the mode of making the retaining device. As such railway-wheels have been long in use, the tire has been secured to the rim in a great variety of ways; but perhaps the most approved is that known as "retaining-rings" or "mansell-rings," which consist of a pair of rings, each having an annular projection at right angles to the plane of the ring, which projection fits into a groove in the side of the tire, while the rings are bolted on each side of the rim by through-bolts passing through the rim, or between the rim and the hub, the object being to retain the tire in contact with the rim if from any cause the tire should be broken while in service. The forms of these rings have been greatly varied; but in all cases the surfaces of the rings and the rim have been held securely in contact by the through-bolts before mentioned, and as thus constructed they effect the object for which they were designed.

While it is entirely practicable to make the fit of the tire upon the rim so close that no force to which its service subjects it will cause the tire to rotate upon the rim, yet the limit is so small between too tight and too loose a fit that it not unfrequently happens that the tire is too loose; and in this case the rings, as heretofore constructed, will simply maintain the tire and rim in their relative positions, but will have no influence to prevent the tire from rotating upon the rim. Moreover, the flat surfaces of the rings and those of the rim, being bolted firmly together by the through-bolts before mentioned, have no more elasticity than a solid mass of iron of equal thickness, so that the bolts are liable to be broken by the jars and shocks to which the wheel is subjected in service.

One object of my invention is to provide retaining-rings which will not only retain the tire in contact with the rim in case the tire is fractured, but which will also prevent the tire from rotating upon the rim in case the fit is too loose.

It is a further object to provide retaining-rings which shall have a certain amount of elasticity under the strain of the through-bolts before mentioned, whereby the effect of the jars and shocks to which they are subjected will be relieved; and it is a further object to adopt such a process of manufacture for these retaining-rings as will insure uniformity of size and shape, while it affords a test as to quality; and to these ends my invention consists in providing a retaining-ring with an annular projection at right angles to the plane of the ring at both the interior and exterior boundary of the ring, and in forming corresponding grooves in the side of the rim and in that of the tire of such depth that the annular projections of the rings will rest upon the bottom of the grooves before the flat surfaces of the rim and the rings can come into contact; and it further consists in securing the retaining-rings upon the rim and the tire by bolts passing midway between the annular projections upon the rings, so that the strain upon the bolts will be equally distributed upon the rim and the tire and prevent the tire from rotating upon the rim, while the unsupported flat surfaces of the rings will afford the desired elasticity for the bolts; and it further consists in rolling a bar of iron or low steel to the form of cross-section described for the retaining-ring, bending this bar to a circular form of less diameter than the finished size and scarfing the ends, then heating these scarfed ends to a welding heat, then placing them in a die formed of a section of a cylinder the size of the ring and provided with grooves in the bottom corresponding to the annular projections on the ring, then welding the ring by pressure in such die, and finally, after the ring is cold, stretching it so as to give it a permanent set at such size as will fit the grooves in the rim and the tire which it is intended to secure.

In order that my said invention may be more fully understood, I will now refer to the drawings, in which—

Figure 1 represents in plan a steel-tired railway-wheel with its retaining-ring broken away at one of the bolts to show more clearly the mode of attachment. Fig. 2 is a sectional elevation of the same, and Fig. 3 is an enlarged view of a section of Fig. 2. Fig. 4 represents a section of a railway-wheel in which the tire is retained with one retaining-ring, and Fig. 5 is a similar section showing the retaining-ring upon the opposite side of the tire. In Fig. 4 the bolts which hold the retaining-ring do not pass across the whole face of the rim, while in Fig. 5 they are shown as passing across the rim with their heads sunk into the side of the rim.

A is the central or hub portion, which in this instance is connected to the rim B by oval arms.

C is the steel tire.

D D are the retaining-rings, and E are through-bolts which compress the retaining-rings upon the rim and the tire.

The annular projections upon the retaining-rings are more clearly shown in Fig. 3, and also the clearance between the flat surfaces of the retaining-rings and the rim. To save labor, when the center or hub portion is of cast-iron or of cast-steel, I cast the rim with notches opposite each arm, through which the bolts pass across the rim, as shown in Fig. 1, where the retaining-ring is broken away, and as thus arranged it will be evident that as the nuts are screwed onto the bolts and the retaining-rings are compressed, the pressure upon the retaining-rings must be equally distributed, or very nearly so, upon the tire and the rim, and that the tire cannot rotate upon the rim without sliding under this pressure, which must create a friction upon the tire greater than could be produced by sliding the tire upon the rail under any load to which it is subjected, and that consequently the tire can never rotate upon the rim. As the retaining-rings are unsupported between the annular projections, the flat surfaces between these projections become springs, which will be more or less stiff as the thickness of the retaining-rings is increased or diminished, whereby a degree of elasticity may be secured which will not only relieve the bolts from sudden strains, but greatly diminish the liability of the nuts to jar loose and unscrew.

In Figs. 4 and 5 I show a mode of securing the tire to the rim with but one retaining-ring. In this case the bolts may pass through the rim, having their heads sunk in the rim, if preferred, as in Fig. 5, or they may have T-heads, as in Fig. 4, fitting into corresponding notches in the rim. In either case the strain of the bolts must be taken upon the annular projections on the retaining-ring, so as to distribute this strain upon both the rim and the tire and so as to afford an elastic support for the bolts.

The retaining-rings may be either of iron or of low steel; but in either case they must be of a quality to weld with certainty and facility. They are rolled with a cross-section— such as I have shown and described herein— and should be bent to a circle as they come from the rolls. This circle should be smaller than the size of the finished ring, sufficiently so to afford opportunity for stretching it to the exact size required after it has been welded. The ends are then scarfed in such manner as to avoid injuring the annular projections, then heated to a welding heat and welded in a die under pressure. This die is formed of a section of a cylinder the diameter of the ring when ready for welding. The bottom of the die is provided with circular grooves to conform to the annular projections on the ring, while the sides are circular, as above described. The ram which imparts the pressure is a portion of a cylinder conforming to the sides of the die, and the end of this cylinder, operating upon the heated metal, is a plane surface at right angles to the axis of its cylindrical sides and of a length to cover a portion of the cold part of the retaining-ring, which will thus form a stop to regulate the thickness of the weld. After the rings are welded, if of steel, they should be annealed, and whether of iron or of steel, when cold, they must be stretched to the proper diameter, preferably by forcing them over a conical mandrel, care being observed to impart the necessary pressure in a plane parallel to that of the ring and at right angles to the axis of the cone, whereby the ring will be straightened as well as enlarged to the proper dimensions and the quality of the weld will be demonstrated.

Having now shown and described my improvements in railway-wheels and in the process of making the retaining-rings, what I claim as new, and desire to secure by Letters Patent, is—

1. As an improvement in railway-wheels, a retaining-ring provided with an annular projection at right angles to the plane of the ring at both the interior and exterior boundary of the ring, substantially as described, in combination with a rim and a tire provided, respectively, with grooves in their sides of such depth that the annular projections on the rings will rest upon the bottom of the grooves before the flat surfaces of the rim and the ring can come into contact, substantially as and for the purposes set forth.

2. As an improvement in railway-wheels, a retaining-ring provided with annular projections, a rim and a tire provided, respectively, with grooves to receive such annular projections, substantially as described, and bolts which pass through the ring midway between the annular projections, substantially as and for the purposes set forth.

3. The process, substantially as described, of making the retaining-rings, which process consists in rolling a bar of iron or of low steel to the form of cross-section described, then bending this bar to a circular form of less diameter than the finished size, and scarfing the ends, then heating these scarfed ends to a welding heat, then welding them by pressing them into a die conformable to the diameter and cross-section of the ring, and finally, when cold, stretching the ring so as to give it a permanent set at such size as will fit the grooves in the rim and the tire which it is intended to retain in their relative positions to each other.

WM. SELLERS.

Witnesses:
ROBT. M. GLENN,
JOHN L. PHILLIPS.